(12) United States Patent
Vanderbeken et al.

(10) Patent No.: US 7,770,328 B2
(45) Date of Patent: Aug. 10, 2010

(54) CABLE AND WINDOW ELEVATOR SYSTEM USING SUCH CABLE

(75) Inventors: Bert Vanderbeken, Waregem (BE); Paul Bruyneel, Ooigem (BE); Luc Dalez, Ruien (BE); Albert Somers, Gentbrugge (BE); Daniël Mauer, Bernissart (BE)

(73) Assignee: NV Bekaert SA, Zwevegem (BE)

( * ) Notice: Subject to any disclaimer, the term of this patent is extended or adjusted under 35 U.S.C. 154(b) by 1095 days.

(21) Appl. No.: 10/496,457

(22) PCT Filed: Nov. 22, 2002

(86) PCT No.: PCT/EP02/13182

§ 371 (c)(1),
(2), (4) Date: Jun. 21, 2004

(87) PCT Pub. No.: WO03/044267

PCT Pub. Date: May 30, 2003

(65) Prior Publication Data

US 2005/0034375 A1    Feb. 17, 2005

(30) Foreign Application Priority Data

Nov. 23, 2001    (EP) .................................. 01204515

(51) Int. Cl.
*E05F 11/48* (2006.01)
(52) U.S. Cl. .............................. 49/352; 57/217; 57/223
(58) Field of Classification Search .................. 49/352; 57/217, 223
See application file for complete search history.

(56) References Cited

U.S. PATENT DOCUMENTS

| | | | | | |
|---|---|---|---|---|---|
| 3,634,607 | A | * | 1/1972 | Coleman | 174/120 R |
| 3,800,522 | A | * | 4/1974 | Hughes et al. | 57/215 |
| 4,344,278 | A | * | 8/1982 | Jamison et al. | 57/221 |
| 4,522,464 | A | * | 6/1985 | Thompson et al. | 385/107 |
| 4,523,804 | A | * | 6/1985 | Thompson | 385/107 |
| 4,606,183 | A | * | 8/1986 | Riggs | 57/221 |
| 4,829,760 | A | * | 5/1989 | Dambre | 57/212 |
| 5,329,605 | A | * | 7/1994 | Wargotz | 385/107 |
| 5,342,699 | A | * | 8/1994 | DeWitte et al. | 428/625 |
| 6,151,833 | A | * | 11/2000 | Gmurowski et al. | 49/352 |
| 6,563,054 | B1 | * | 5/2003 | Damien et al. | 174/120 C |
| 6,692,829 | B2 | * | 2/2004 | Stubler et al. | 428/379 |
| 2002/0189227 | A1 | * | 12/2002 | Roux et al. | 57/7 |
| 2004/0105634 | A1 | * | 6/2004 | Bosisio et al. | 385/100 |
| 2006/0174606 | A1 | * | 8/2006 | Stram | 60/247 |

FOREIGN PATENT DOCUMENTS

| | | |
|---|---|---|
| DE | 1 904 468 | 8/1970 |
| DE | 33 44 985 A1 | 6/1985 |
| EP | 0 864 688 A1 | 9/1998 |
| GB | 1 563 712 | 3/1980 |
| WO | WO 00/23504 A1 | 4/2000 |
| WO | WO 00/23505 A1 | 4/2000 |

\* cited by examiner

*Primary Examiner*—Jerry Redman
(74) *Attorney, Agent, or Firm*—Foley & Lardner LLP

(57) ABSTRACT

A cable (11) is provided comprising a steel cord (12) and a polymer material (15). The steel cord (12) has a diameter less than 2.5 mm, and is coated with the polymer material (15). The cable (11) has a permanent elongation of less than 0.05% at a permanent force of 50 N, after being subjected to a force of 450 N. Further, a window elevator system (300) comprising such a cable (11) is provided.

22 Claims, 3 Drawing Sheets

CABLE AND WINDOW ELEVATOR SYSTEM USING SUCH CABLE

FIELD OF THE INVENTION

The present invention relates to a cable, and the use of such cable in a window elevator system, comprising such cable as part of its transmission member and the use of such cable in control cable applications, static or dynamic applications, e.g. hoisting, timing belts, flat belts or V-belts.

BACKGROUND OF THE INVENTION

Window elevator systems as known in the art, comprise a window, clamping parts holding the window, guiding parts (fixed elements or small wheels) over which the cable is bend in order to guide the cable in a defined direction, a driving drum and a transmission member. The transmission member transfers the rotating movement of the driving drum to the window. Usually, a known transmission member comprises a galvanized steel cable, which moves inside a casing. Such casing is usually a steel casing, coated with a polymeric coating. Between the galvanized steel cable and the inner side of the steel casing, a polymer inner liner is placed, being a polymer tube, fitting closely with the inner side of the steel casing.

Galvanized steel cables, being part of such transmission member, have to meet several requirements, such as a high corrosion resistance (simulated by means of the so-called "salt spray test"), a temperature stability in the temperature range from −40° C. up to 90° C. or even up to higher temperatures for a short period of time, high tensile strength and a good fatigue resistance. Requirements which are to be met in order to provide systems which function during the whole life-time of the vehicle.

Further, the weight of the steel cord, and of the transmission member as a whole, is to be as low as possible. The cable of the transmission member is to be bend in curvatures having decreasing bending radii. Such curvatures are found at the guiding parts of the window elevator system, over which the cable is to be bend. These decreasing bending radii require cables with increased flexibility and fatigue resistance. Finally, the cable has to have a minimum of permanent elongation, after being subjected to an elongating force. Too much permanent elongation leads to incorrect closing and opening of the windows, and a cable which runs off the guiding parts of the system, since the cable looses its tensioning around these guiding parts.

Several attempts have been made to provide a solution to all above-mentioned problems simultaneously, however with little result.

Cables used for control cable applications or other static or dynamic applications have to have also limited permanent elongation and are subjected to similar if not identical requirements.

Also in other applications, relatively small cables have to have a very limited permanent elongation. E.g. cables used to open and close breaks of scooters, bicycles and other vehicles, preferably have no or very small permanent elongation. If the permanent elongation is too large, inadequate displacement of the connected elements of the breaks may occur.

SUMMARY OF THE INVENTION

According to the present invention, a cable is provided comprising a polymer coated steel cord, said cable having a permanent elongation of less than 0.05% at a permanent force of 50 N, after being subjected to a force of 450 N. Cables, as subject of the invention comprises a steel cord, which has an optical diameter of less than 2.5 mm. The optical diameter is the diameter of the smallest imaginary circle, which encircles a radial cross section of the steel cord.

The polymer material and the degree of penetration of the polymer material between the steel elements of the cable, the thickness of the coating and the construction of the steel cord may be chosen in such a way that the cables meet the required properties in an optimal way.

Cables, as subject of the invention comprise a steel cord, which preferably has a relatively small optical diameter. The optical diameter of the cord is preferably less than 2.5 mm, more preferred less than 2.3 mm or even less than 2 mm, most preferably less than 1.85 mm or even less than 1.55 mm. The optical diameter is the diameter of the smallest imaginary circle which encircles a radial cross section of the steel cord.

The steel cord usually has a breaking load of less than 3150 N.

A cable as subject of the invention has a very limited permanent elongation at a load of 50 N after being loaded with a load of 450 N. Possibly, a permanent elongation may be obtained of less than 0.05%, even less than 0.04%, preferably however less than 0.03% or even less than 0.02%. Identical if not similar permanent elongation may even be obtained when the cable is subjected to a load causing tensile strengths in the cord in the range up to 390 N/mm$^2$, or even up to 580 N/mm$^2$, or even up to levels of 820 N/mm$^2$ or 1185 N/mm$^2$. The tensile strengths are calculated using the steel surface in the radial cross-section of the cable.

A cable as subject of the invention comprises a steel cord, which on its turn comprises several steel filaments.

The tensile strength of the steel filaments are preferably more than 1700 N/mm$^2$, or more than 2000 N/mm$^2$ or even more 2600 N/mm$^2$, most preferably more than 3000 N/mm$^2$ or even more than 4000 N/mm$^2$. The diameter of the filaments is less than 210 μm, preferably less than 160 μm, most preferably less than 110 μm.

All filaments may have an identical diameter. Possible the diameter of the filaments may differ from each other. Preferably, the diameter of the filaments, providing an inner strand of the cable is larger than the diameter of the filaments, used to provide the outer strands or layer of filaments to the cable, which improves the penetration of the polymer material into the void spaces of the cable.

A steel cord, used to provide a cable as subject of the invention, comprises several steel elements, being transformed into a steel cord, using a steel cord construction. Due to the steel cord construction, void spaces are provided between the steel filaments of the steel elements of the cord. Also void spaces are provided between the steel elements. "Void space" as used hereafter is to be understood as all area of a radial cross-section of the cord, located inwards of the imaginary circle having as diameter the optical diameter of the cord, which area is not occupied by steel.

Steel cords have an inner layer or core, which is preferably a strand of several steel filaments. Around such core, at least one layer of additional steel elements is provided. The steel elements of the additional layer can either be steel filaments or steel strands, on its turn comprising steel filaments. The outer layer of steel elements (either filaments or strands) is hereafter referred to as "jacket layer". The "jacket center circle" as used hereafter, is the imaginary circle connecting the centers of the steel elements of the jacket layer. Various steel cord constructions may be used.

Examples here are:

- multi-strand steel cords e.g. of the m×n type, i.e. steel cords, comprising m strands with each n wires, such as 4×7×0.10, 7×7×0.18, 8×7×0.18 or 3×3×0.18; the last number is the diameter of the wire, expressed in mm.
- Multi-strand steel cords, comprising a core stand of l metal filaments, and n strands of m metal filaments, surrounding the core strand. These steel cords are hereafter referred to as l+n×m type cords, such as 19+9×7 or 19+8×7 cords;
- Warrington-type steel cords;
- compact cords, e.g. of the 1×n type, i.e. steel cords comprising n steel wires, n being greater than 8, twisted in only one direction with one single step to a compact cross-section, such as 1×9×0.18; the last number is the diameter of the wire, expressed in mm.
- layered steel cords e.g. of the l+m (+n) type, i.e. steel cords with a core of l wires, surrounded by a layer of m wires, and possibly also surrounded by another layer of n wires, such as 2+4×0.18; the last number is the diameter of the wire, expressed in mm.

The steel composition is preferably a plain carbon steel composition, i.e. it generally comprises a minimum carbon content of 0.40% (e.g. at least 0.60% or at least 0.80%, with a maximum of 1.1%), a manganese content ranging from 0.10 to 0.90% and a silicon content ranging from 0.10 to 0.90%; the sulfur and phosphorous contents are each preferably kept below 0.03% ; additional micro-alloying elements such as chromium (up to 0.2 a 0.4%), boron, cobalt, nickel, vanadium . . . may be added to the composition; stainless steel compositions are, however, not excluded.

Such steel cords, without a polymer coating, usually have a permanent elongation at a load of 50 N, after being subjected to an elongation load of 450 N, which is substantially more than 0.05%. The more complex the cord construction is, the larger the difference in permanent elongation becomes between a cable being such bare cord and a cable as subject of the invention using such cord.

Preferably, the polymer material is applied is such a way that at least a part of the void space, present radial inwards of the jacket center circle, is filled with polymer material. Most preferred, at least 10% or even more than 15% of the void space radial inwards of the jacket center circle is filled with polymer.

Preferably, a polymer material is provided around the steel cord in such a way that the void spaces are filled for more than 30%, or even for more than 40% or 50%.

Even more preferred, polymer material is provided around the steel cord in such a way that the void spaces between adjacent steel elements are substantially filled with polymer material. Preferably more than 90%, most preferably even more than 95% or more than 99% of all void space is filled with polymer material. The coating may be provided using different techniques such as extrusion, lamination or dipping. Preferably, the coating is provided via extrusion.

Best results as far as the limitation of the permanent elongation as subject of the invention are obtained, when thermoplastic elastomers (TPE) are used, such as styrene polymers (TES), polyurethane (PU) or polyurethane copolymers, polyetheresters (TEEE), polyetheramide (PEBA), thermoplastic vulcanizates or silicone. Preferably, thermoplastic polyurethane is used. Homopolymers of ester, ether or carbonate polyurethane may be used, as well as copolymers or polymer blends. Possibly however, polytetrafluorethylene (PTFE) may be used. Preferably, the polymer material has a shore D hardness varying between 60 and 100, preferably between 85 and 95. Alternatively, thermoset polymers may be used.

Possibly, plasticizers or other additives may be added to the polymer material, to improve its behaviors, such as e.g. lowering its friction coefficient, to improve the UV-resistance of the polymer material, to reduce the humidity absorption properties of the polymer material or to improve the temperature stability in a larger temperature range of the polymer material.

A preferred cable as subject of the invention has a polymer material which is chemically anchored to the steel using appropriate coatings. Reference for possible coatings is made to WO0023505.

The thickness of the polymer material, being defined as the half of the difference of the optical diameter between the coated and non-coated steel cord, is preferably less than 250 µm, most preferably less than 200 µm or even less than 100 µm.

A cable as subject of the invention preferably is provided in such a way that a radial cross section of such cable has a substantially circular shape. Alternatively, a radial cross-section of the cable has an outer profile, which is substantially similar to the profile of a radial cross-section of the cord.

The diameter of the smallest circle encompassing this radial cross section of the cable, being the optical diameter of the cable, is preferably less than 3 mm, most preferably less than 2.75 mm, or even smaller than 1.6 mm.

A cable as subject of the invention has several advantages over the present prior art.

A cable as subject of the invention has a very good resistance to corrosion. Subjected to a salt spray test (ISO9227), such cables do not show any corrosion after 600 hours. It was found that the conventional coatings, such as Zn-coatings which are applied to the steel cables used in prior art, or the use of grease with corrosion protective additives to improve the corrosion resistance, are no longer necessary to obtain acceptable levels of corrosion resistance. Notwithstanding this, the steel cords used to provide a cable as subject of the invention, may have a coating such as yellow brass coatings, electrolytic galvanized coating or hot dip galvanized coating to improve the processability of the steel elements, steel strands and/or steel cord and to improve the polymer coating process, e.g. the extrusion process.

At a load of 450 N, a cable as subject of the invention shows a limited level of creep, being typically less than 0.005%. The elongation of the cable when being subjected to a load of 450 N is usually less than 0.6%, preferably less than 0.5% or even less than 0.4% or 0.3%.

Also the fatigue resistance is improved, and its flexibility is significantly improved. This is clear from the "three-roller" test, where the products have a fatigue cycle of at least 2 times more, or even up to 5 or 10 times more as compared with a life time of identical uncoated cables. Fatigue life cycles of more than 8000 cycles, but usually and preferably more than 9000 or even more than 15000 and more than 20000 cycles are obtained The temperature resistance is also improved. The polymer coating, especially when a polyurethane coating is used, does not show a degradation of properties in the range of −40° C. to 90° C., and resists exposures of at least one hour to temperatures above 90° C.

Conventional cables known in the prior art, may loose their oil or grease due to the elevated temperatures, which result in higher corrosion or a decrease of friction properties. Since there is no oil or grease needed, hardening of the cable due to hardening of the oil or grease does not occur. The problem of oil or grease, attracting dust and small particles such as sand particles, and causing excessive wear of parts and causing noise, is avoided.

A cable as subject of the invention further doesn't flare when cut into pieces to be used in the appropriate application. This allows easier mounting of the cable in the different systems, e.g. window elevator systems.

A cable as subject of the invention may be used for several purposes, such as window elevator systems, sunroof opening systems, cables to move sliding doors, seat adjustment systems, seat release cables, brake cable for vehicles such as bicycles, scooters such as jet- or snowscooters, derailleur or shift lever cables for vehicles such as bicycles, jetskis, waterskis or scooters, cable for directing mirrors in vehicles, cables for adjusting or commanding gear systems of bicycles or other vehicles and cables used to start small combustion engines. Cable as subject of the invention may also be used for control cable applications, static or dynamic applications, e.g. hoisting, timing belts, flat belts or V-belts.

Especially the corrosion resistance properties and the temperature stability of the cables as subject of the invention provide a benefit over the known prior art. Further, since the cables provide a good flexibility and higher fatigue resistance, the cables can be bent over smaller guiding pieces in he transmission system in which it is used. Also the use of a polymer liner inside a casing, which is to be used when using ordinary, non-coated cords, can be omitted. This results in less weight and a more simple construction of the transmission systems in which the cable as subject of the invention is used.

Especially, a window elevator system comprising a cable as subject of the invention is provided according to the present invention.

A window elevator system as subject of the invention comprises a clamping system for holding a window, a rotating device (e.g. a motor or a manual rotating device), a cable as subject of the invention and at least one guiding part, over which the cable is bend. The cable may slide partially in a casing.

A window elevator system as subject of the invention has several advantages due to the use of a cable as subject of the invention.

The window elevator system provides a stable and reliable movement of the window. This is due to the low elongation at 50 N after being loaded to a level of 450 N.

The window elevator system is simplified and does not have to comprise as much elements as in prior art. An inner liner between casing and cable is not necessary, and the guiding part or parts may be reduced in size, having smaller bending radii.

Further the use of oil and/or grease may be reduced or avoided, meanwhile obtaining a very good resistance to corrosion.

BRIEF DESCRIPTION OF THE DRAWINGS

The invention will now be described into more detail with reference to the accompanying drawings wherein.

DECSRIPTION OF THE PREFERRED EMBODIMENTS OF THE INVENTION

Figure 1:
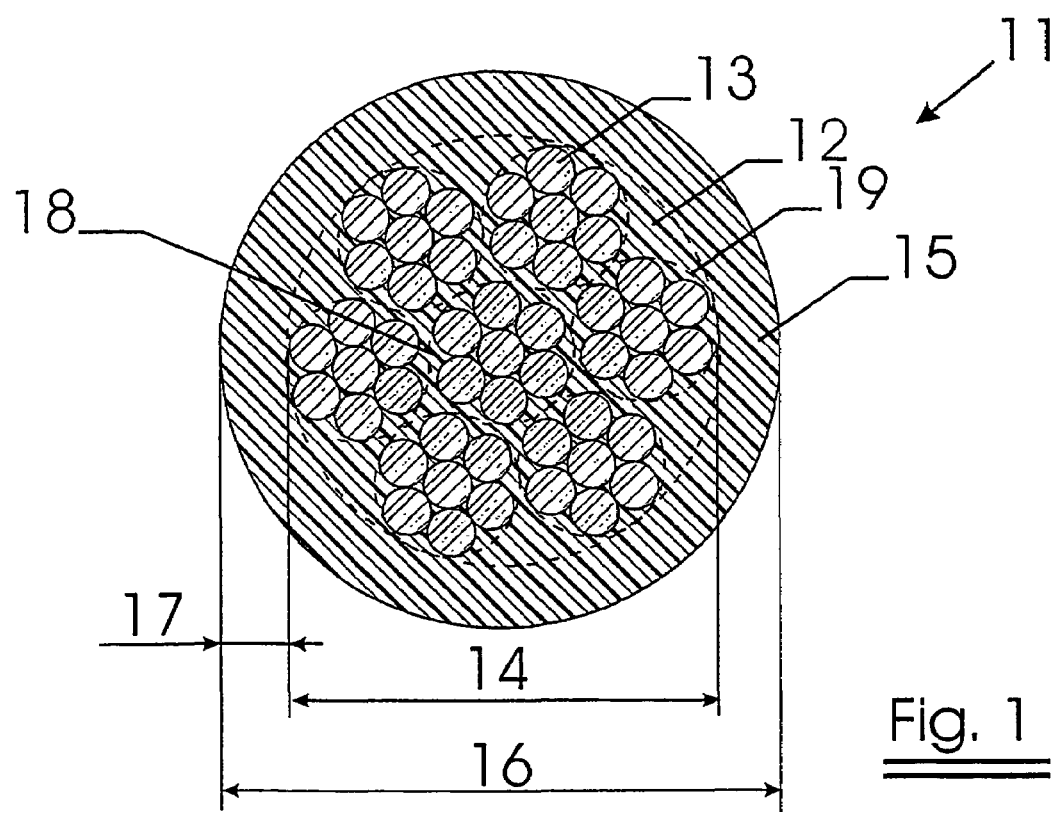
FIG. 1 is a schematic view of a cable as subject of the invention

An embodiment of the present invention is provided in FIG. 1, being a cable 11 as subject of the invention. The cable comprises a steel cord 12, which on its turn comprises several steel filaments 13. The present embodiment shows a steel cord "7×7×n" being seven strands 19, each strand having 7 steel elements 13 of diameter of n mm.

The steel cord has an optical cord diameter 14. The steel cord is coated with a polymer material 15, so providing a cable 11 as subject of the invention with an optical cable diameter 16. The thickness 17 of the polymer coating is half of the difference between optical cord diameter and optical cable diameter. As shown in FIG. 1, preferably the void space 18 between the different steel elements 13 is substantially filled with polymer material 15.

Several embodiments where tested, as given in Table I. Such cable embodiments are coded as "7×7×n+PU". Identical cables without coating are were also tested and the results are incorporated in Table I as well (coded 7×7×n bare). All filaments had a tensile strength of approximately 2800 N/mm$^2$. The polymer used to coat the steel cords to provide a cable as subject of the invention was polyurethane.

TABLE I

| Cord identification | Optical Ø steel cord (mm) | Thickness of polymer coating (mm) | Elongation in load range of 50 N to 450 N (%) | Force at rupture (N) | Permanent el. at 50 N, after subjection to 450 N (%) |
| --- | --- | --- | --- | --- | --- |
| 7 × 7 × 0.15 bare | 1.35 | 0 | 0.328 | 2181 | 0.052 |
| 7 × 7 × 0.15 PU | 1.35 | 0.075 | 0.298 | 2241 | 0.018 |
| 7 × 7 × 0.12 bare | 1.05 | 0 | 0.440 | 1530 | 0.06 |
| 7 × 7 × 0.12 PU | 1.05 | 0.075 | 0.413 | 1560 | 0.015 |
| 7 × 7 × 0.10 bare | 0.9 | 0 | 0.617 | 1056 | 0.053 |
| 7 × 7 × 0.10 PU | 0.9 | 0.05 | 0.585 | 1044 | 0.017 |

Figure 2:
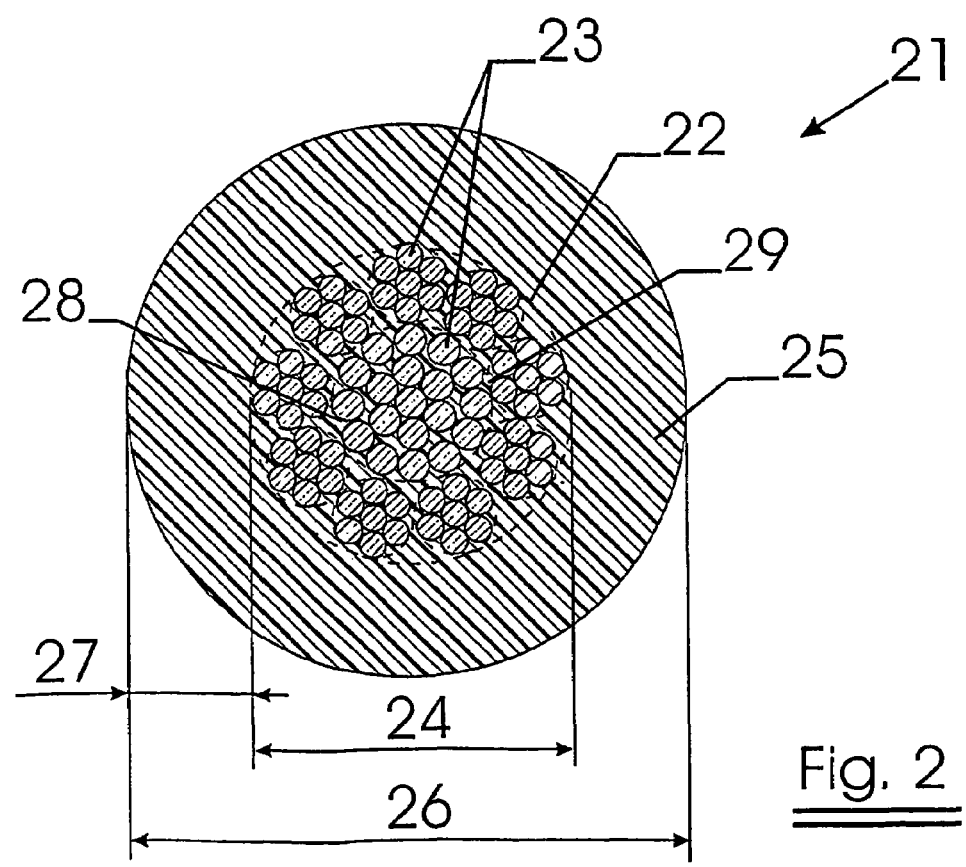
FIG. 2 is a schematic view of an other cable as subject of the invention.

FIG. 2 shows an alternative embodiment of a cable 21 as subject of the invention.

The cable comprises a steel cord 22, which on its turn comprise several steel filaments 23. The present embodiment shows a steel cord 22 being a core strand comprising nineteen steel filaments 23, around which eight strands 29 of each time seven steel filaments 23 are twisted. The steel cord has an optical cord diameter 24. The steel cord is coated with a polymer material 25, so providing a cable 21 as subject of the invention with an optical cable diameter 26. The thickness 27 of the polymer coating is half of the difference between optical cord diameter and optical cable diameter. As shown in FIG. 2, preferably the void space 28 between the different steel elements 23 is substantially filled with polymer material 25.

Test results of an embodiment are given in Table II, in which the embodiment is coded "steel cord +PU". The diameter of all steel elements is 0.1 mm. All filaments had a tensile strength of approximately 2800 N/mm$^2$. The polymer used to coat the steel cords to provide a cable as subject of the invention was polyurethane. Identical cables without coating were also tested and the results are incorporated in Table II as well (coded "steel cord bare").

The above mentioned and described steel cords all were provided using several steel elements, which have an equal diameter. To further improve the degree of filling the void spaces between the elements, steel cords comprising steel filaments, which have different diameters, may be used.

During coating of the steel cord, care was taken that the polymer has filled substantially all void space between the steel filaments of the cord, so polymer material is present at the void space radial inwards of the jacket center circle of the cord. Preferably more than 30% of all void space between the filaments is filled with polymer material. Even more preferred, more than 90% of all void space between the filaments is filled with polymer material, most preferably more than 95% or even more than 99% is filled with polymer material. In the above tested embodiments more than 99% of all void space was filled with PU.

All above given embodiments were subjected to a corrosion test according to ISO9227. After 600 h, no indication of corrosion was noticed.

All above given embodiments were subjected to a fatigue test, so called "three roller test". This test provides data, giving significant information on the flexibility of the cable and the resistance to periodical bending loads.

Figure 5:
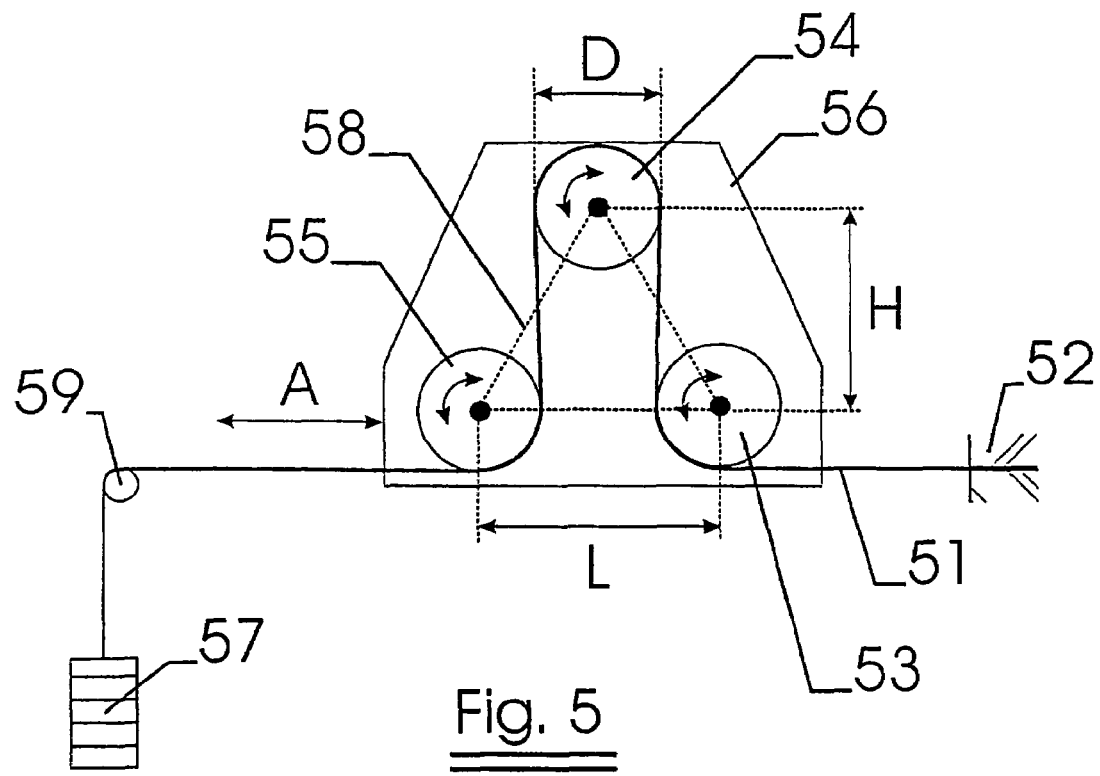
FIG. 5 is a schematic view of the three-roller-test.

The test is schematically shown in FIG. 5. A cable 51 is clamped at one end by means of a clamping device 52. The cable 51 is bend around three rollers (53, 54 and 55), which are mounted rotationally on a metal piece 56. The other end of the cable is loaded with a force by means of a weight 57. The three rollers 53, 54 and 55 are mounted on the metal piece 56 in such a way that they are located at the corners of an isosceles triangle 58, which has its hypotenuse parallel with the imaginary connection line between clamping device 52 and bending point 59. The lower points of the rollers 53 and 55, are also points of this imaginary connection line between clamping device 52 and bending point 59.

The rollers 53, 54 and 55 have a diameter D of 20.3 mm. The length of the hypotenuse (L) is 62.1 mm and the height of the triangle (H) is 12.5 mm. The weight 57 is chosen to provide a force of 150 N.

The cable, mounted on this testing device, is subjected to a fatigue test by moving the metal piece 56 fore and backwards, in the direction of the imaginary connection line between clamping device 52 and bending point 59, over a certain length A, being 90 mm. Such movement is done cyclically, with a frequency which is set to 230 movements per minute. In such a way, the cable is cyclically subjected to a bending action. The number of movements is counted before the cable breaks. Results of the tests, done on the cables as described in FIG. 1 and FIG. 2 are shown in Table III.

TABLE II

| Cord identification | Optical Ø steel cord (mm) | Thickness of polymer coating (mm) | Elongation in load range of 50 N to 450 N (%) | Force at rupture (N) | Permanent el. at 50 N, after subjection to 450 N (%) |
|---|---|---|---|---|---|
| 19 + 9 * 7 * 0.1 bare | 1.117 | 0 | 0.388 | 1956 | 0.082 |
| 19 + 9 * 7 * 0.1 + PU | 1.117 | 0.0665 | 0.352 | 1973 | 0.021 |

TABLE III

| | Cycles up to breaking | |
|---|---|---|
| sample | bare | PU |
| 7 x 7 x 0.12 bare | 1499 | 8724 |
| 7 x 7 x 0.12 bare | 693 | 10731 |
| 7 x 7 x 0.10 bare | 1168 | 18062 |
| 19 + 9 * 7 * 0.1 bare | 2885 | 24338 |

Figure 3:
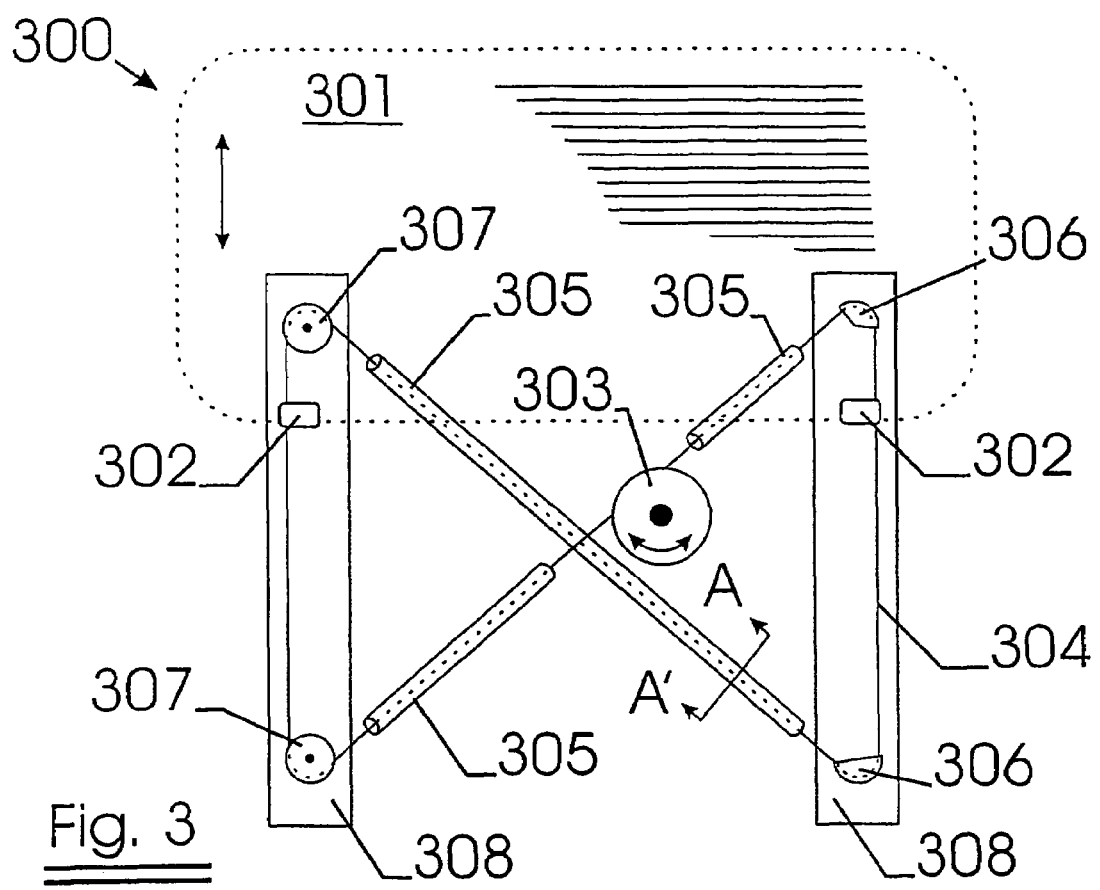
FIG. 3 is a schematic view of a window elevator system as subject of the invention

The cables as subject of the invention may be used in a window elevator system 300 of which an example is shown in FIG. 3. Such window elevator system 300 comprises clamping elements 302 which hold the window 301. The clamping elements 302 are mounted to the cable 304 as subject of the invention. This cable 304 transfers the rotating movement of the rotating device 303 to a lifting (up or down) of the window 301. Certain parts of the cable may move (slide) inside a casing 305. Where the cable is to be bend over a curve with relatively short bending radius, guiding parts such as fixed elements 306 or wheels 307 may be used, which are on its turn mounted on a fixing element 308.

Figure 4:
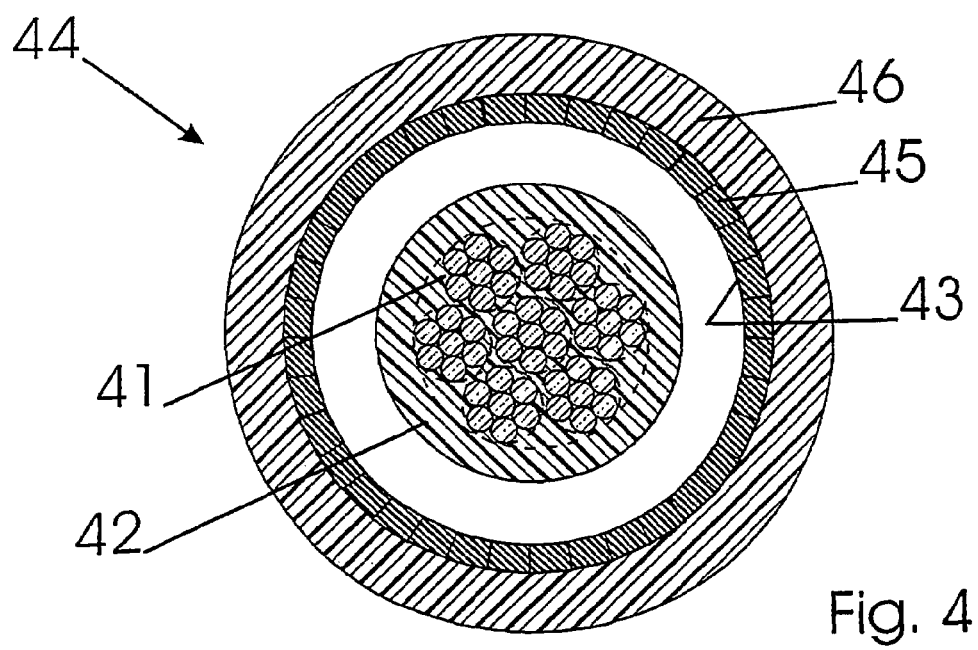
FIG. 4 is a schematic view of a radial cut of a cable as subject of the invention sliding in a casing.

The use of a cable as subject of the invention has several advantages. The cable is pretensioned over the guiding elements 306 and 307, since otherwise the cable will run of these guiding element when the cable is used to transfer the rotating movement of the driving drum to a displacement of the glass. When the permanent elongation is too large however, the level of pretentioning may decrease, since the cable elongates, which on its turn may cause disfunctioning of the whole system. Further, as shown in FIG. 4, which is a cut over the plane AA', in case a cable in a casing is used, there is no risk of metal-metal contact between the steel cord 41 of the cable 42 and the metal inner surface 43 of the casing 44, being a metal reinforcing structure 45, coated externally with a polymer layer 46. A polymer inner liner between casing and cable is no longer necessary.

This also is applicable when the cable as subject of the invention is used for other purposes, in which a cable is to move inside a casing, such as for the closing of the breaks in scooters and bicycles. The same cables as subject of the invention can be used for control cable applications, static or dynamic applications, e.g. hoisting, timing belts, flat belts or V-belts, cables used in elevator door systems mirror cables, brake cables, hood and trunk release cables.

Figure 6:
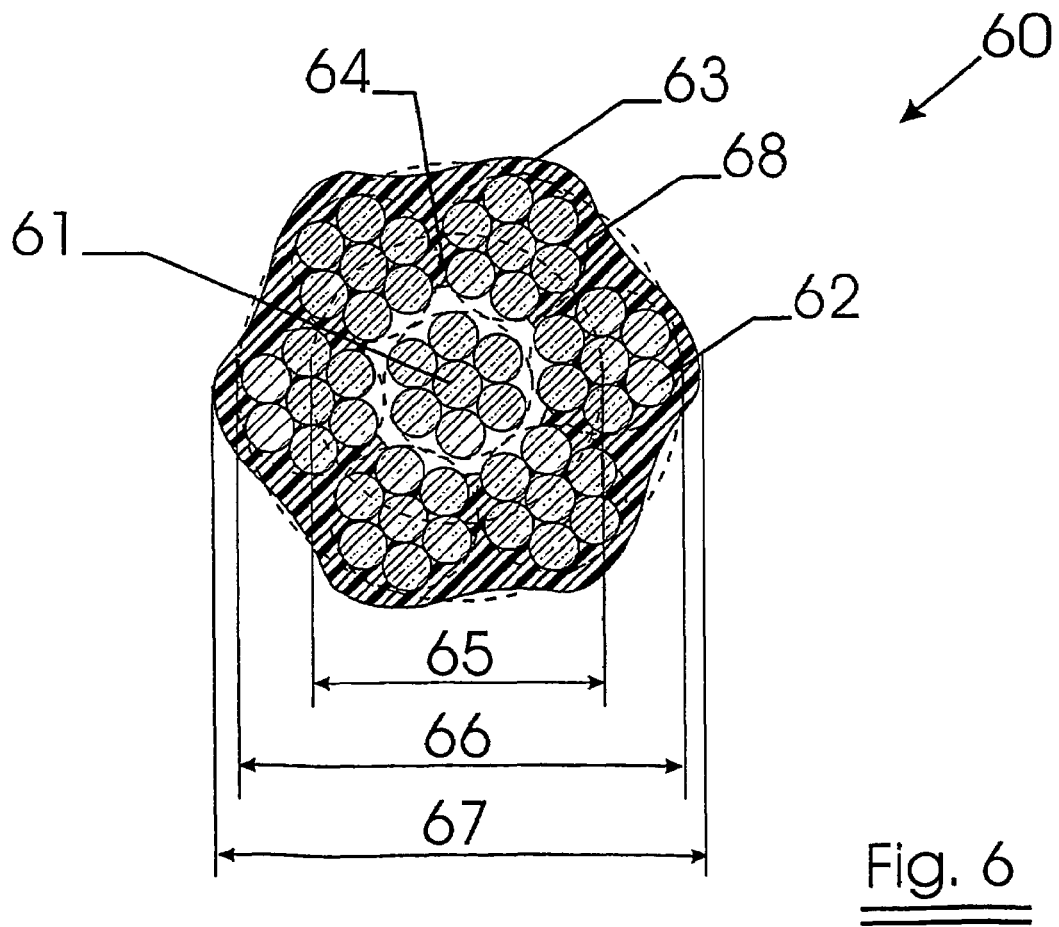
FIG. 6 shows schematically an other cable as subject of the invention.

An other cable as subject of the invention is shown in FIG. 6. The cable 60 has a steel cord comprising a core strand 61 of steel filaments, encompassed with a jacket layer of 6 strands of each 7 steel filaments. The cord is substantially identical as the one shown in FIG. 1. The steel cord is provided with a polymer layer 63 which is this embodiment does not have a circular cross section, but which essentially has the same outer profile as the cord used. Alternatively, other profiles may also be obtained. The cable optical diameter is indicated 67, whereas the cord optical diameter is indicated 66. It is clearly shown that the polymer material 63 is present in the void spaces 64 of the cord, radially inwards of the jacked layer circle, indicated 68. Preferably at least 30% of the void space is filled with polymer. Most preferred Polyurethane is used as polymer material. Care is taken to obtain a chemical bondbetween the steel and polymer material.

The invention claimed is:

1. A cable, comprising:
   a steel cord comprising an outer jacket layer having a jacket center circle, and
   a thermoplastic material having a shore D hardness between 60 and 100,
   wherein said steel cord has an optical diameter less than 2.5 mm, said steel cord being coated with said thermoplastic material, at least part of said thermoplastic material being provided radially inwards of said jacket center circle, said thermoplastic material being chemically anchored through an intercalated bi-functional adhesion promoter to said steel cord, and said cable has a permanent elongation of less than 0.05% at a permanent force of 50 N after being subjected to a force of 450 N.

2. A cable as claimed in claim 1, said steel cord comprising at least two steel elements, said steel cord having void space between said steel elements, said thermoplastic material filling more than 30% of said void space.

3. A cable as claimed in claim 1, said cable having an optical diameter of less than 3 mm.

4. A cable as claimed in claim 1, said steel cord having a breaking load of less than 3150 N.

5. A cable as claimed in claim 1, said cord having an optical diameter of less than 2 mm.

6. A cable as claimed in claim 1, said thermoplastic material being a thermoplastic elastomer.

7. A cable as claimed in claim 6, said thermoplastic elastomer being polyurethane.

8. A cable as claimed in claim 1, said thermoplastic material being a thermoset polymer.

9. A cable as claimed in claim 1, said cable having a substantially circular radial cross section.

10. A cable as claimed in claim 1, said cable having an elongation of less than 0.6% when being subjected to a force of 450 N.

11. A window elevator system, comprising a cable as claimed in claim 1.

12. A control cable, comprising a cable as claimed in claim 1.

13. A cable as claimed in claim 1, said cord having an optical diameter of less than 2.00 mm.

14. A window elevator system, comprising:
   the cable according to claim 1,
   a clamping system,
   a rotating device,
   at least one guiding part, wherein
   said cable is bent around guiding elements.

15. A window elevator system, comprising:
   the cable according to claim 1,
   a clamping system,
   a rotating device,
   at least one guiding part,
   wherein said cable is bent around guiding elements, and
   wherein said window elevator system further comprises a casting.

16. A cable as claimed in claim 1, said cable being a control cable.

17. A cable as claimed in claim 1, wherein the thermoplastic material is a material selected from the group consisting of styrene polymers, polyurethane copolymers, polyurethane copolymers, poly ether esters and poly ether amides.

18. A cable as claimed in claim 1, said cable being free of lubricants.

19. A window elevator system, comprising:
   a clamping system,
   a rotating device,
   at least one guiding part, and
   a cable, said cable being bent around guiding elements,
   wherein said cable comprises a steel cord comprising an outer jacket layer having a jacket center circle, and a thermoplastic material having a shore D hardness between 60 and 100, wherein said steel cord has a diameter less than 2.5 mm, said steel cord being coated with said thermoplastic material, at least part of said thermoplastic material being provided radially inwards of said jacket center circle, said thermoplastic material being chemically anchored through an intercalated bi-functional adhesion promoter to said steel cord, and wherein said cable has a permanent elongation of less than 0.05% at a permanent force of 50 N after being subjected to a force of 450 N.

20. A window elevator system as claimed in claim 19, said window elevator system further comprising a casing.

21. A window elevator system as claimed in claim 19, wherein the thermoplastic material is a material selected from the group consisting of styrene polymers, polyurethane, polyurethane copolymers, poly ether esters and poly ether amides.

22. A window elevator system as claimed in claim 19, said cable being free of lubricants.

* * * * *